March 24, 1964 — N. CORDIS — 3,125,989
AUGER-TYPE ANIMAL FEEDER
Filed April 4, 1960 — 3 Sheets-Sheet 1
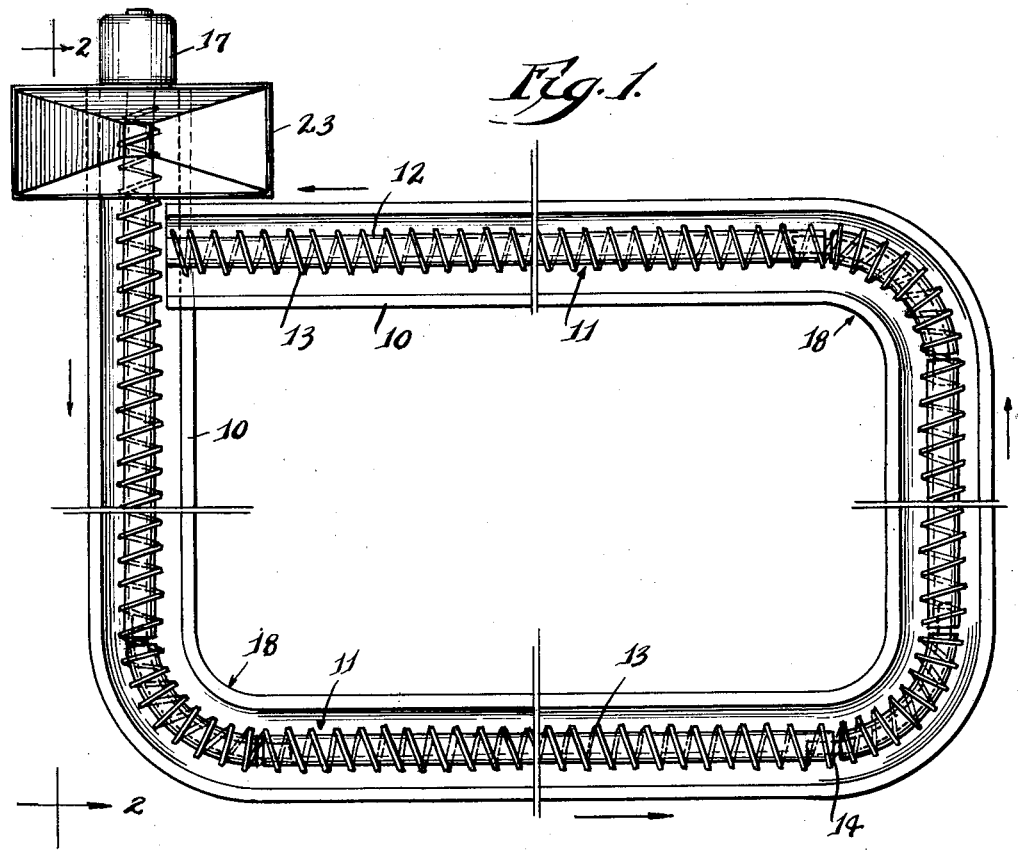
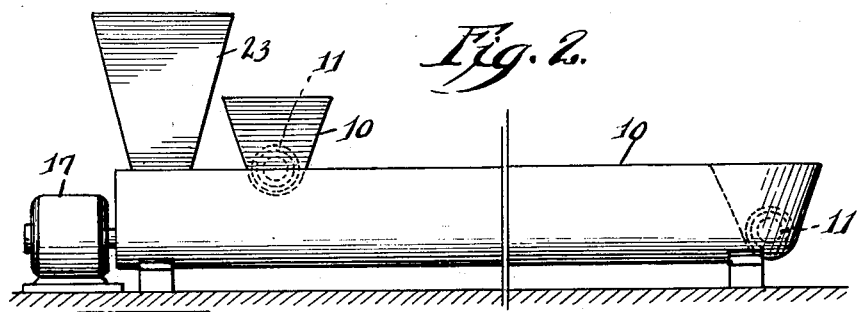
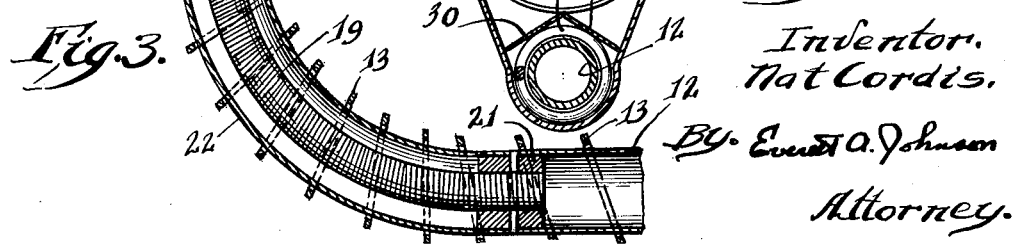
Inventor.
Nat Cordis.
By Everett A. Johnson
Attorney.

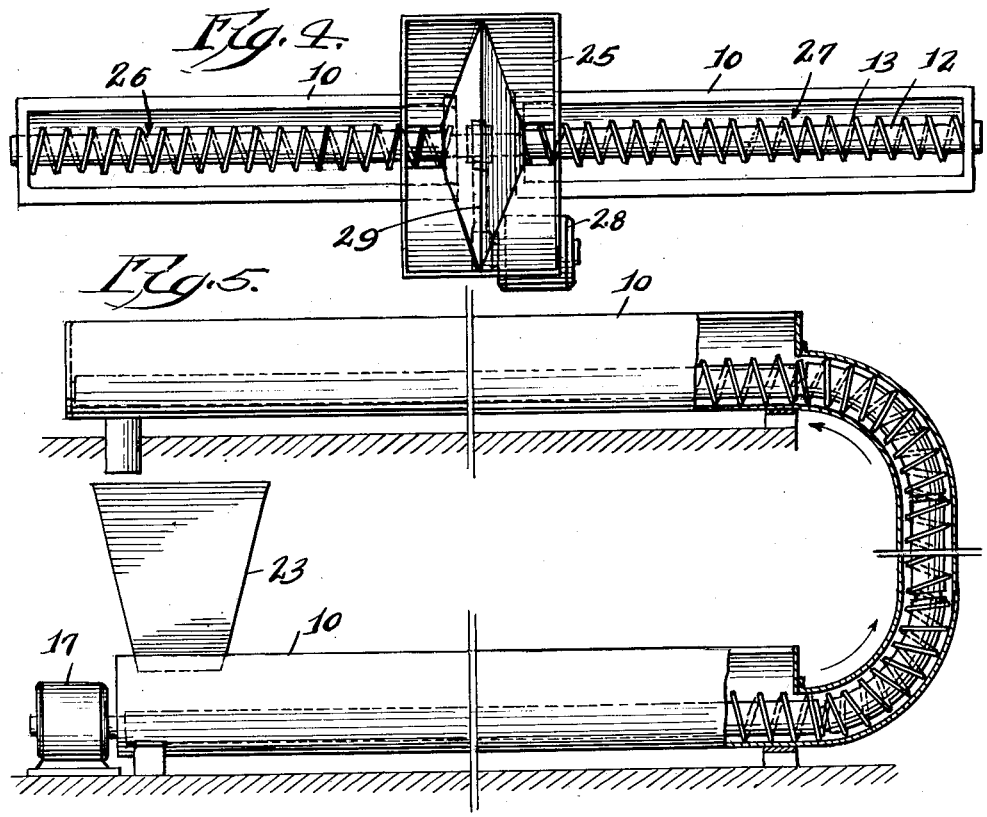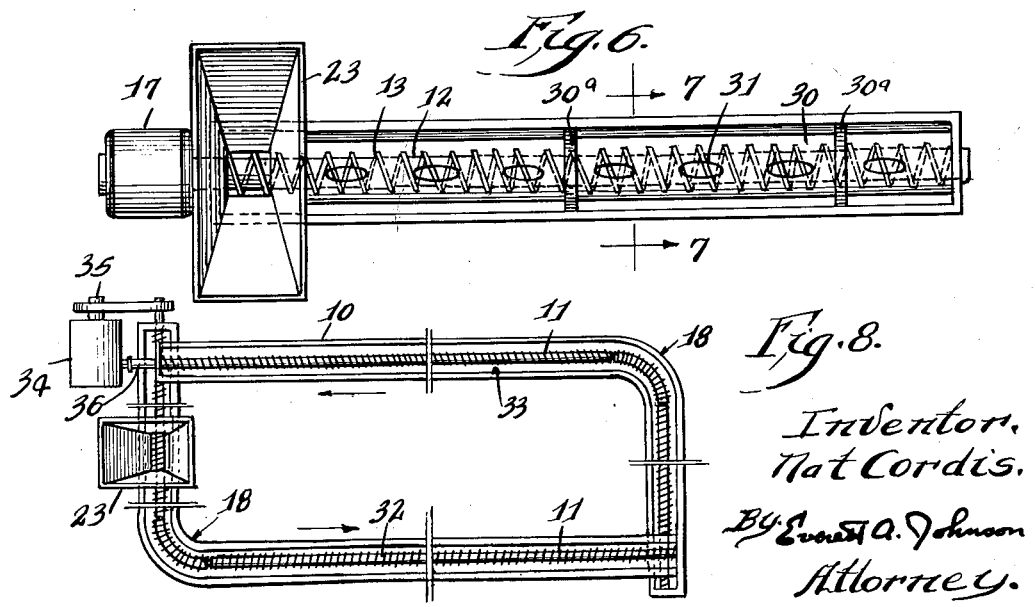

March 24, 1964   N. CORDIS   3,125,989
AUGER-TYPE ANIMAL FEEDER
Filed April 4, 1960   3 Sheets-Sheet 3
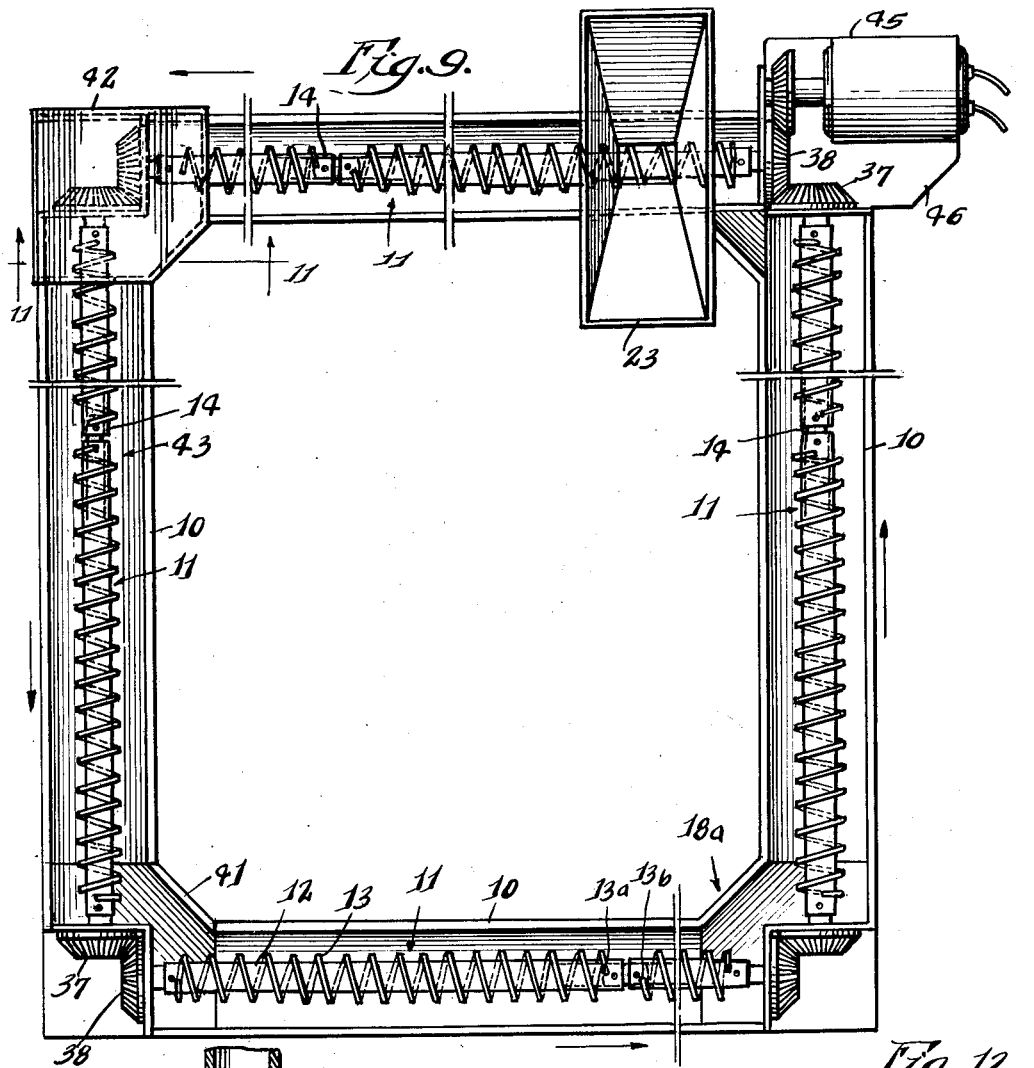
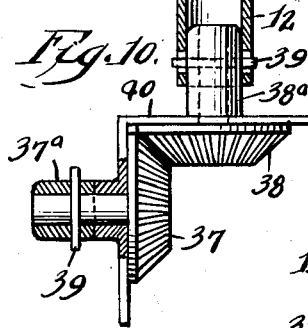
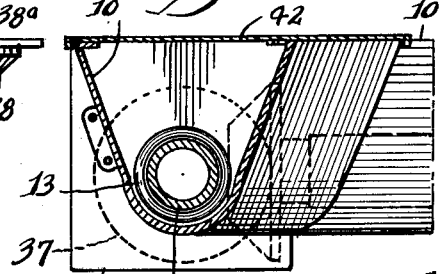
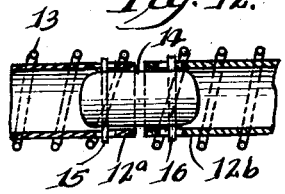
Inventor.
Nat Cordis.
By Everett A. Johnson
Attorney.

United States Patent Office 3,125,989
Patented Mar. 24, 1964

3,125,989
AUGER-TYPE ANIMAL FEEDER
Nat Cordis, Crown Farms, Silver Lake, Wis.
Filed Apr. 4, 1960, Ser. No. 19,556
15 Claims. (Cl. 119—52)

This invention relates to conveyors for flowable solid materials and, more particularly, to a feeding device for distributing pulverant materials along an open-topped trough accessible to stock including poultry.

The feeding of live stock, such as poultry, on a large scale necessarily involves much manual attention. Accordingly, a primary object of this invention is to provide a feeder of large capacity in which the feeding can be controlled with a minimum of attention by an operator. Another object is to provide a method and automatic means for uniformly distributing a supply of fresh feed within a flock feeder. An additional object is to provide an automatic and controllable feeder which is rugged and inexpensive in construction. A further object is to provide an apparatus which maintains a continuously renewed supply of feed in a trough and minimizes the possibility of accumulating stale feed along the path of the conveyor. It is also an object of this invention to provide a conveyor mechanism which is quiet running, which requires a minimum of attention for maintenance of its mechanical components, and which does not tend to disturb the feeding poultry. Likewise, it is a further object to provide a system which can handle various types of feed and without tending to grind the feed within the trough.

A further important object is to provide an apparatus which is readily expandable for various sizes of flocks of poultry but which is also efficient for use in connection with relatively small flocks. A more specific object of the invention is to provide a conveyor element which is of simple sturdy construction, and is uniform in its feed conveying capacity. These and other objects of my invention will become apparent to those skilled in the art as the description thereof proceeds.

Briefly, I attain the objects of my invention by providing an open-topped trough having an auger operating member therein. The operating member comprises a thin-walled metal tube about which is wound a helix secured at spaced points to the tube. Such members may be in lengths of about 10 ft., and a plurality of members may be linked one to the other in straight-line or closed-loop relationship. In either event, the member is driven by suitable motor means so as to rotate the member within the trough. Due to the construction of the member, including the loosely wound helix about the flexible tubing, the member tends to follow the contour of the trough and it is not necessary that such trough be absolutely linear.

In the closed-loop embodiment, each corner is provided with rotation transmitting means, several embodiments thereof having been developed and will be described in more detail below.

At a point along the trough a feed hopper is provided, and the feed is impelled along the trough by the rotation of the operating member as will be more readily understood by reference to the accompanying drawings wherein:

FIGURE 1 is a schematic plan view of one embodiment of the invention showing the general assembly of parts;

FIGURE 2 is an end view drawn to an enlarged scale and taken along the line 2—2 in FIGURE 1;

FIGURE 3 illustrates on an enlarged scale an embodiment of a drive connection for use at a corner;

FIGURE 4 is a plan view of a straight-line feeder with a central hopper feeding in two directions;

FIGURE 5 is another embodiment of the invention adapted for use on multi-levels;

FIGURE 6 is an apparatus wherein the operating member is enclosed, the enclosure having feed delivery ports;

FIGURE 7 is a section taken along the line 7—7 in FIGURE 6;

FIGURE 8 represents on a reduced scale a continuous feeder of an open-loop type wherein two segments of the feeder assembly are separately driven directly from a single motor;

FIGURE 9 is a plan view of a closed-loop feeder having gear-type power transfer means at the corners;

FIGURE 10 shows on an enlarged scale the details of such a gear-type corner;

FIGURE 11 is a section on an enlarged scale taken along the line 11—11 in FIGURE 9; and FIGURE 12 illustrates on an enlarged scale the details of one form of coupling for the operating member.

Referring to the drawings, a feeding trough 10 contains an auger or operating member 11 comprising a flexible tube 12 and a helix or spring 13 thereabout and therealong. The ends 13a and 13b of the spring 13 are secured to the ends 12a and 12b of the tube 12. Adjacent ends 12a and 12b of two aligned operating members 11 are linked by plug connectors 14 within the ends 12a and 12b and through all of which pins 15 and 16 extend, as shown in FIGURE 12.

In FIGURES 1, 2, 5 and 6, a motor 17 is connected in drive relationship to a first auger 11a. A corner 18 as shown in FIGURE 3 comprises a flexible shaft 19 fixed to plugs 20 and 21 in tubes 12. The spring 13 is fixed to the ends 12a and 12b of the adjacent tubes 12 and operates about the fixed corner guide tube 22.

The hopper 23 discharges into the trough 10, the auger 11 conveys the feed along the trough 10, around corners 18 and returns excess feed to the trough 10, either directly, as shown in FIGURES 1, 2 and 8, or through the hopper 23, as shown in FIGURE 5.

In FIGURE 4, the feed from hopper 25 discharges into the trough 10 having two arrays 26 and 27 of operating members 11, each adapted to convey feed outwardly of the hopper 25. A motor 28 and pulley drive 29 power this unit.

In FIGURES 6 and 7, the auger 11 is enclosed by hood 30 having delivery ports 31 through which feed is expelled by the auger 11.

Referring to FIGURE 8, the auger members 11 are in two arrays 32 and 33 each directly driven by the motor-transmission 34 having two output shafts 35 and 36 connected to arrays 32 and 33 respectively. The feed from the end of 32 discharges over the inlet end of 33, and the end of 33 discharges into the inlet end of 32, the hopper 23 adding additional feed as required.

The feeder in FIGURES 9, 10 and 11 is of the closed-loop type with respect to the trough 10 and the operating member 11. A plurality of connectors 14 link lengths of operating members 11 as needed.

Each corner 18a comprises gears 37 and 38 on stub shafts 37a and 38a secured, as by pins 39, to ends 12a and 12b of the adjacent operating member 11. A frame 40 supports the gears 37 and 38 and the corner housing 41. A cover 42 confines the feed in the corner 18a as the feed passes from one array 43 to the next array 44.

To operate the feeder of FIGURES 9, 10 and 11, one of gears 37 is driven by an electric motor-transmission (speed reducer) 45 carried by base plate 46 secured to a corner 18a.

The auger 11 is, of course, an important feature of my invention and it should be noted that the internal diameter of spring 13 is greater than the outer diameter of the tube 12 and is attached only at the ends 12a and 12b of the tube by the spring ends 13a and 13b. This construction provides the unique trough-hugging characteristics of the auger members 11.

To remove debris from the trough 10, the discharge from the hopper 23 or 25 is stopped and a "half-nut" follower (not shown) is placed over the auger and travels thereover to bulldoze the debris from the trough.

The drives shown comprise electric motors and it is contemplated that time cycle controllers (not shown) may be provided and that feed level sensing devices (not shown) can be used in the troughs to over-ride such time cycle controllers.

Although my apparatus has been described in terms of particular embodiments thereof which have been set forth in considerable detail, it should be understood that this is by way of illustration only and that my invention is not limited thereto. Alternative constructions and operating techniques will become apparent to those skilled in the art in view of my disclosure and, accordingly, it is contemplated that modifications can be made without departing from the spirit of the described invention.

What I claim is:

1. In a stock feeder including a trough and a conveyor operating therein, the improved feed conveyor comprising an elongated flexible member adapted to transmit a turning torque, a floating helical conveying member loosely wound about said elongated member, said helical conveying member only being secured to said elongated member at spaced points for rotation therewith.

2. The conveyor of claim 1 which includes a hood over said auger member, said hood having discharge ports spaced along a top wall portion thereof whereby feed is conveyed below said hood and expelled upwardly therefrom through said spaced ports into a stock feeder comprising said conveyor.

3. The conveyor of claim 1 wherein said elongated member is thin-wall tubing of sufficient length to be flexible and said helical conveying member is a coil spring attached at its ends to said tubing.

4. The conveyor of claim 3 which includes a direction-changing member in a non-linear portion of said conveyor.

5. The conveyor of claim 4 wherein said direction-changing member comprises a flexible shaft connecting non-linear sections of tubing and said helical conveying member bridges said flexible shaft whereby there is positive conveying of feed throughout the length of said member.

6. A stock feeder comprising an open-topped trough means accessible to stock, feed hopper means discharging into said trough means, an auger conveyor rotatable within said trough means adjacent the bottom thereof, and means for rotating said conveyor, said conveyor comprising a flexing elongated member, a coil spring about said member and substantially coextensive therewith, said spring being of larger internal diameter than the transverse dimension of said member, and means for securing the ends of said spring to said member.

7. A stock feeder comprising an open-topped trough circuit means into which a feed supply is discharged, said trough circuit means having linear and non-linear sections, and an auger conveyor rotatable within said trough circuit means, said auger conveyor comprising a plurality of coupled sections of thin-walled tubing, means coupling said sections of tubing, and coil spring means loosely fitted about said tubing, said spring means corresponding substantially in length to each section of tubing and being fixed to said tubing at the ends thereof.

8. The feeder of claim 7 wherein the trough circuit means is arranged in a substantially horizontal plane.

9. The feeder of claim 7 wherein the trough circuit means is arranged in a substantially vertical plane.

10. A stock feeder comprising a continuous trough means having linear and non-linear sections, a multi-segmented auger-type conveyor rotatable in said trough means, direction-changing means in said non-linear sections, said direction-changing means including a non-linear segment of an auger-type conveyor coupled to adjacent linear segments of said conveyor, one end of a section in said trough means discharging into another section thereof, and hopper means discharging into said trough means.

11. A stock feeder comprising a hopper, trough means extending bi-directionally of said hopper, an exposed auger conveyor within said trough means impelling feed bi-directionally from said hopper toward opposite ends of said trough means.

12. A stock feeder for use on two levels comprising a first trough section at a first level, a hopper discharging into a first end of said section, a second trough section at another level, an elevator conduit between said sections, a transfer conduit discharging from said second section into said hopper, and an auger-type conveyor rotatably disposed within said first section, said elevator conduit, and said second section, said conveyor comprising an articulated torque member and a coil spring spaced about said member and fixed thereto at longitudinally spaced points.

13. A stock feeder comprising a pair of trough means having linear and non-linear segments, a hopper, separate arrays of auger conveyors in each segment, each of said auger conveyors comprising linear and non-linear sections, the first trough means receiving feed from said hopper and discharging into said second trough means and said second trough means discharging into said first trough means up-stream of said hopper, said conveyors comprising a flexible torque member and a helically coiled member spacially carried thereby, and drive means for said conveyors.

14. The feeder of claim 13 wherein the drive means is a single motor oppositely driving said auger conveyors from adjacent ends thereof.

15. A stock feeder comprising a trough and an auger-type conveyor means operating therein, said conveyor means comprising a coupled section of thin wall tubing, a helical member about said tubing, said member being of rectangular cross-section and spirally wound about said tubing but "floating" thereabout, and means for securing the ends of said helical member to individual sections of tubing adjacent the ends thereof.

References Cited in the file of this patent

UNITED STATES PATENTS

| | | |
|---|---|---|
| 2,620,917 | Dahlberg | Dec. 9, 1952 |
| 2,646,023 | Virgil | July 21, 1953 |
| 2,745,381 | Wallace et al. | May 15, 1956 |
| 2,869,715 | Williams | Jan. 20, 1959 |
| 2,918,037 | Polley | Dec. 22, 1959 |
| 2,934,199 | Winkler | Aug. 26, 1960 |
| 2,961,126 | Craig | Nov. 22, 1960 |
| 3,003,464 | Bailey | Oct. 10, 1961 |